March 21, 1944.    F. J. SOMERS    2,344,745
ELECTRICAL CIRCUIT
Filed Sept. 26, 1941    2 Sheets—Sheet 1
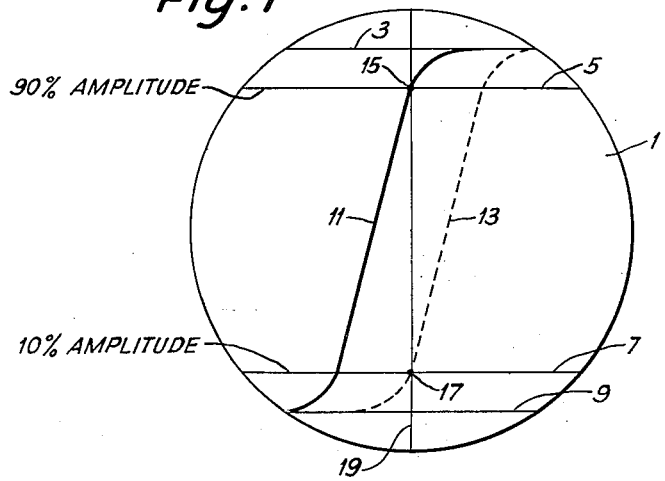
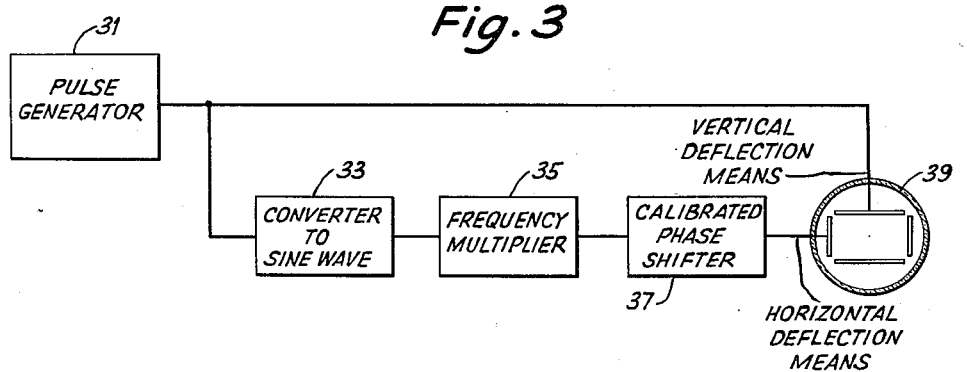
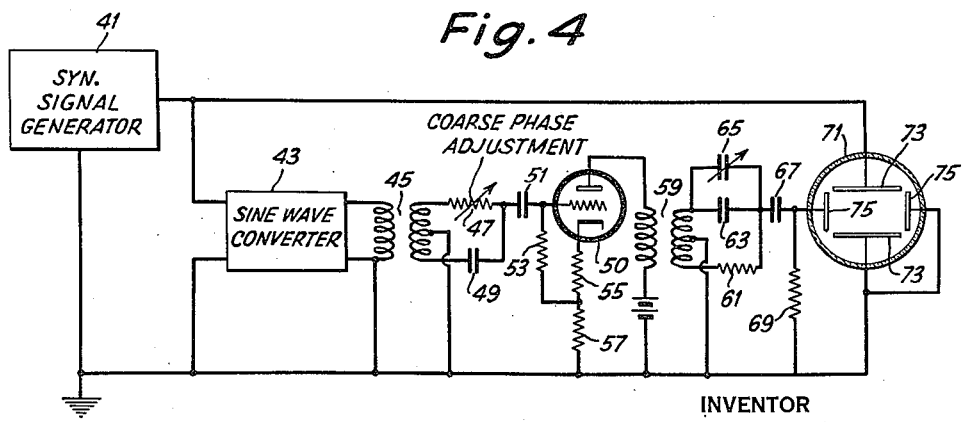
INVENTOR
F. SOMERS
BY
ATTORNEY March 21, 1944.  F. J. SOMERS  2,344,745
ELECTRICAL CIRCUIT
Filed Sept. 26, 1941  2 Sheets-Sheet 2
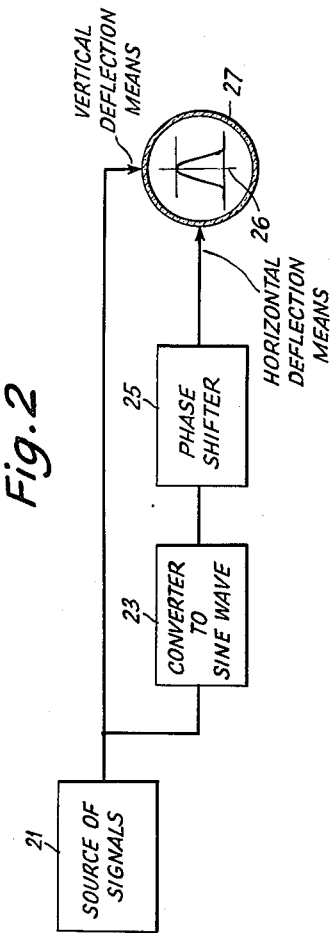
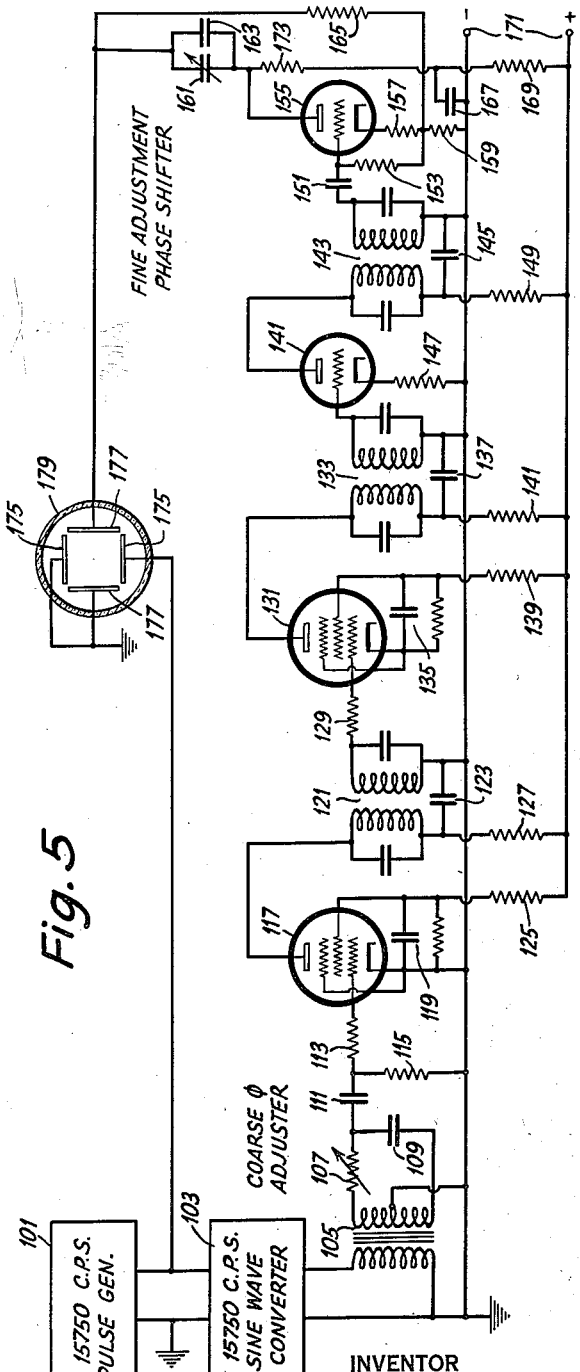
INVENTOR
F. SOMERS
BY H. Grover
ATTORNEY Patented Mar. 21, 1944

2,344,745

UNITED STATES PATENT OFFICE 2,344,745

ELECTRICAL CIRCUIT

Frank J. Somers, Rockville Centre, N. Y., assignor to Radio Corporation of America, a corporation of Delaware Application September 26, 1941, Serial No. 412,406

9 Claims. (Cl. 171—95)

This invention relates to electrical circuits and, in particular, to improved methods and apparatus for measuring the slopes and duration times of electrical impulses, such as, for example, television synchronizing impulses.

In television systems where successful operation depends upon precise control and maintenance of the tolerance of the steepness of wave front and time duration of synchronizing impulses, it is necessary to have measuring equipment which is capable of rapidly determining the steepness of wave front and time durations of these waves.

For example, in a television system having 525 line scanning and 30 frames per second, the scanning frequency is 15,750 cycles per second and, assuming that the synchronizing impulse is to have a value of 8% of one horizontal deflection cycle, it will be observed that the duration of the pulse is only on the order of 5 microseconds. A further requirement of a synchronizing signal is that it shall have a steep wave front so as to rise from its minimum value to its maximum value in about 1/20 of the time duration of the pulse. The slope therefore has a duration of 0.4% of the scanning cycle. The conventional method of determining the slope is to measure linear dimensions of the trace of the impulse on the face of the oscilloscope and such measurements in practice have an accuracy of only ±1%, which results in an error whose absolute value is greater than the value of the slope to be measured. Conventional methods of measuring time intervals are therefore inapplicable where the duration is on the order of microseconds or less.

By using my method and apparatus precise measurement of the slope is readily obtainable and the errors already referred to reduced or eliminated. This is achieved by producing a trace of the slope of the impulse upon a cathode ray oscilloscope, shifting the trace thus produced so that the top of the trace coincides with an indicia reference mark on the screen, noting the reading of the shifting means, thereafter producing a further shift in the trace so that the bottom of the trace coincides with the same indicia reference mark, and noting the reading of the shifting means for this second position. The difference between the second and first reading is indicative of the slope of the curve and by suitable calibration the slope may be read directly in percentage of the impulse cycle. The method and apparatus, therefore, provide a more rapid means of determining slope and duration of the impulses and at the same time provide a more precise determination of these factors.

Accordingly, it is the main objective of my invention to provide new, novel, and useful method and apparatus for measuring the slope and duration of short impulses.

Another objective of my invention is to provide an electrical measuring system which is capable of measuring the slope of the leading and trailing edges of electrical impulses to a high degree of precision.

Another objective of my invention is to provide a method and apparatus for determining precisely the slope of television synchronizing signals in terms of percentage of scanning cycle.

A still further objective of my invention is to provide method and apparatus for readily determining the characteristics of television synchronizing signals in order to insure that such signals do not deviate from standard television signals.

Other objectives of my invention will become clear upon reading the following detailed description, taken together with the drawings.

In the drawings, Figure 1 is a graphical representation of the principles embodied in my invention. Figures 2 and 3 are blocked diagrams embodying the principles of my invention. Figure 4 shows in somewhat more detail certain features shown in the blocked diagram of Figure 2, while Figure 5 shows a circuit diagram embodying the principles of my invention.

In accordance with my invention, I have shown in Figure 2 in blocked diagram form a simple arrangement for measuring the slopes of the leading or trailing edges, as well as the time durations of electrical impulses. A source of signals 21 is fed to the vertical deflection means of a cathode ray tube 27. The signals are also fed to a converter 23. The converter serves to generate from the impulse (which may have any recurrent wave form) signals having a relatively pure sinusoidal wave form whose period is equal to the periodicity of the signals from the source 21. The output of the sine wave converter 23 is then fed to a phase-shifting means 25 and the output of the phase shifter is fed to the horizontal deflection means of the oscillograph 27. It will be appreciated that since the horizontal deflection is in synchronism with the signal whose wave form is to be measured that there will appear on the screen of the oscillograph 27 a stationary image representative of the signal's wave shape. Manipulation of the controls of the phase shifter 25 will produce a phase displacement of the potential fed to the horizontal deflection means and, consequently, the stationary image will be moved laterally across the screen of the cathode ray tube 27. The measurement of the slope is effected by shifting the trace of the impulse through the agency of the phase shifter 25, so that the maximum amplitude of the slope portion of the wave front or tracing edge coincides with the vertical index mark 26 and thereafter shifting the vertical trace so that the minimum value of the slope coincides with the same vertical index mark 26. The difference in phase angle to effect the shifting of the trace to bring the maximum value and the minimum value in coincidence with the reference mark 26 divided by 360 and multiplied by 100 gives the slope of the leading or trailing edge in percentage of a cycle. This follows from the fact that the phase shifter 25 being calibrated in degrees of phase shift gives a reading, when following the above outlined procedure, in which the difference between the initial and final position of the trace with respect to the reference mark 26 is in degrees of phase shift. Since one cycle corresponds to 360 degrees, the degrees of phase shift divided by 360 is the ratio of the slope to the complete cycle, that is to say, the ratio of the time that it takes for the signal to build up from minimum to maximum value for the leading edge or to fall from the maximum value to the minimum value for the trailing edge to the time of one complete cycle. Consequently, multiplying this ratio by 100 will give the slope in terms of the percentage of the complete cycle. It will be appreciated that the phase shift dial may be calibrated directly in per cent of a scanning cycle, or in any other convenient units instead of in degrees, thus facilitating the work of making measurements.

A suitable filter is included in the sine wave converter, in accordance with the usual practice, so that the horizontal deflection wave is free from harmonic distortion. Furthermore, it should be noted that the central index point (15 to 17 on Fig. 1) is (depending on the horizontal D. C. centering of the oscilloscope) always at or near the point where the horizontal sine wave deflection goes through its zero voltage value. Consequently, moderate amounts of compression in the horizontal deflection amplifier of the oscilloscope (subsequent to the calibrated phase-shifter) tending to compress the extremes of the horizontal sweep, will, within the limits of no appreciable grid current being drawn by the horizontal deflection amplifier tubes, have no effect on the accuracy of the width or slope measurements. Therefore, as long as the sweep remains linear in the central portion of the screen, the horizontal amplitude can be increased so that the part of the wave of greatest interest can be expanded considerably in the horizontal direction, making for more accurate readings and more precise measurements. Even if the trace is not intentionally expanded so that the effective sweep is wider than the oscilloscope screen, the part of the wave of greatest interest is always in the center of the cathode ray tube, where, due to the sinusoidal deflection wave form, it appears considerably expanded over what it would be with a sawtooth wave sweep of equal peak amplitude. This latter feature naturally makes for increased accuracy of measurement. Finally, it should be pointed out that the phase shifting element itself can be made a very stable and reliable device, especially, if the shift in phase is obtained by means of a variable air condenser. This can be equipped with a vernier dial for reading exceptionally small increments.

To still further increase the accuracy of measurement, I have shown, as a further embodiment of my invention, a blocked diagram in Figure 3 which includes, in addition to the unit shown in Figure 2, a frequency multiplier 35. Since my invention is particularly useful for the measurement of wave slope of television synchronizing signals, although not limited thereto, I have illustrated in the blocked diagram the application of my invention to such measurements. The pulse generator 31 feeds simultaneously the vertical deflection means of a cathode ray oscillograph 39 and a sine wave converter 33. The output of the sine wave converter 33, in this case, instead of being fed directly to the phase shifter, is fed to a frequency multiplier 35. The frequency multiplier 35 may be of any conventional type and serves to multiply the frequency, preferably for ease of calculation, to ten times that of the frequency of the pulse generator and the sine wave converter 33. The output of the frequency multiplier is suitably filtered to provide a substantially pure sinusoidal wave and thereafter is fed to the calibrated phase shifter 37. The output of this phase shifter is then connected to the horizontal deflection means of the tube 39.

It will be appreciated that since the horizontal frequency is stabilized by energy from the pulse generator 31, that there will again appear on the face of the tube 39 a stationary visual trace. Since, however, the horizontal trace frequency is ten times that of the frequency of the pulse generator 31, the effect is to stretch out the stationary image to ten times the length that it would have possessed if a frequency corresponding to that of the pulse generator 31 were used to provide the horizontal trace. The net result is to produce a trace in which the slope of the leading or trailing edge appears visually to be much less on the screen of the tube 39, that is to say, that the slope has a greater horizontal distance between its minimum and maximum value. As a result, the setting of the trace with respect to the reference marks can be performed with a greater degree of precision.

To still further improve the precision of the measurements, instead of utilizing the minimum and maximum value of the wave form, I propose to use, for example, a value greater than minimum amplitude and a value less than maximum amplitude for determining coincidence of the slope with the vertical and initial reference mark.

The reason for such selection of values is that the maximum and minimum values ordinarily have a slope approaching zero and, consequently, it becomes exceedingly difficult to determine just the point at which both the maximum and minimum values are reached. By selecting values 10% of the maximum amplitude and 90% of the minimum amplitude this difficulty is eliminated. Thus, in Fig. 1 I have shown the screen of the cathode ray tube 1 marked with a vertical indicia reference mark 19. The zero amplitude, line 9, and the maximum amplitude, line 3, are shown as well. Two other indicia reference marks are also placed on the screen of the tube corresponding to 10% amplitude 7 and 90% amplitude 5. It will be readily noticed that the slope of the trailing edge of the signal 11 can readily be determined where it crosses the vertical indicia mark 19 at the point 15 coinciding with the intersection of the line 19 with the line 5 corresponding to 90% of the amplitude, whereas, it will be noted that it is difficult to tell where the line 11 first touches the 100% amplitude line 3.

In this case, it has been assumed that the trace of the signal under consideration 11 has been shifted so that it coincides both with the intersection of the vertical reference line 19 and the 90% amplitude line 5. Thereafter the trace is shifted by the phase shifter so that it assumes the position shown at 13, at which point the trace 13 coincides with the intersection of the vertical reference mark 19 and the 10% amplitude reference mark 7. The shift in phase necessary to produce the lateral displacement between the traces 11 and 13 is an indication of the slope of the trace. The selection of the 10% and 90% values, which were suggested as typical values, are in no way exclusive of using any other values. The selected values of 10% and 90% are particularly useful in television, since the standards approved by the Federal Communications Commission for commercial television, as of July 1, 1941, specify that the slope of synchronizing signals shall be measured between the values of 10% and 90% of the maximum amplitude.

I have shown in Figure 4, in somewhat more detail, a circuit arrangement embodying my invention and including a modification which makes for greater ease in operation. In the figure, assuming that the slope of a television synchronizing signal is to be measured, the output of the synchronizing signal generator 41 is fed to the vertical plates 73 of the oscillograph 71. Output energy from the generator 41 is also fed to the sine wave converter 43 to change the synchronizing pulse to a sine wave. The output of the sine wave generator is fed through the transformer 45 to a serially connected resistor 47 and condenser 49. The secondary of the transformer 45 is center tapped and potential is fed to the tube 50 through condenser 51, the energy being obtained between the center tap of the transformer 45 and the common junction point of the resistor 47 and the condenser 49. As shown, the resistor 47 is made variable, although this resistor may have been made fixed and the condenser 49 made variable.

The circuit arrangement comprising the transformer 45, the resistor 47, and the condenser 49 constitutes a means for a coarse adjustment of the phase of the sinusoidal sweep. As is known, a serially connected resistor and condenser connected across a center tapped secondary affords a means for varying the phase of a sinusoidal wave without varying the amplitude of the wave to a first approximation, if output energy is taken between the center tap of the secondary and the common junction point of the resistor and condenser. Actually, the constancy of amplitude is determined by the regulation of the source supplying the transformer and the leakage reactance of the transformer as a function of the amount of output energy absorbed.

Where the output circuit, as shown in Figure 4, is relatively high impedance, the change in amplitude is negligible with change of phase. The resistor 47 is made variable in preference to making the condenser variable for coarse phase adjustment because a greater change in ratio of resistance can be obtained than a corresponding change in ratio of capacity. The tube 50 has a resistor 53 to provide an appropriate return path for the grid to cathode circuit, while the resistor 55 and 57 serve to appropriately bias the tube 50. Connected to the plate of the tube 50 is a transformer which feeds the circuit elements comprising the fine phase adjustment. These circuit elements are the resistor 61 connected in series with parallely connected condensers 63 and 65. The condenser 65 is made variable and may conveniently have a capacity of about one-fifth that of the condenser 63. The values of the resistor 61 and condenser 63 are ordinarily chosen so that their impedances at the frequency of the synchronizing impulses are approximately equal. Under these conditions the output voltage will be substantially in phase with the input voltage. The voltage drop between the mid-tap of the transformer 59 and the common junction point 61, and the serially connected condensers are fed across the horizontal deflection means 75 of the cathode ray tube 71 through the condenser 67, and an appropriate leak resistor 69 is provided so that the horizontal deflection plates 78 are not permanently charged.

The operation of the circuit shown in Figure 4 is to bring the slope of the wave to be measured in approximate registration with the vertical index mark of the screen by varying the resistor 47. Thereafter the stationary trace of the wave is brought into precise register by varying the variable condenser 65. The dial of the variable condenser 65 is preferably calibrated directly in per cent of a scanning cycle and is obtained from a knowledge of the values of the resistor 61 and the tube condensers 63 and 65. Thus, a change in unit capacity of the variable condenser 65 amounts to a change in phase angle determined by the circuit perameters, since each degree of phase shift amounts to $^{100}/_{360}\%$, the capacity calibration of the condenser 65 may be readily converted into per cent of the scanning cycle. The reading of the dial when the trace has been brought into register, for example, at 90% amplitude mark, is noted. The condenser 65 is then varied until the trace coincides with the intersection of the 10% amplitude and vertical indicia reference marks. The setting of the condenser is again noted. The difference between the first and second readings gives directly the percentage of scanning cycle that the slope of the wave form occupies.

It will be readily appreciated that the same technique may be used for measuring the duration of the impulse by noting the readings of the phase shifter at the beginning and the end of the impulse, that is to say, that the reading may be noted for the intersection of the leading edge of the impulse with the 10% amplitude mark and the vertical reference index and then shifting the entire trace until the trailing edge intersects with the same intersection of reference marks. The difference in the two readings will then indicate the duration of the impulse in per cent of the entire scanning cycle.

To still further increase the precision of measurement, the horizontal deflection may be exaggerated, and, accordingly, I have shown such a modification in Figure 5. In this figure, and again for purposes of illustration only, assuming that a television synchronizing impulse is to be measured, the pulse generator 101 feeds the vertical deflecting plates 175 of the oscillograph 179 as well as the sine wave converter 103. The output of the converter 103 is fed through a coarse phase adjustor comprising the transformer 105, the variable resistor 107, and the condenser 109. The output of the phase adjuster is then fed to the frequency multiplying tube 117 having zero bias on its control electrode and a series grid current limiting resistor 113. By overdriving the tube 117, a large number of harmonics is produced in the output circuit of the tube 117. The output circuit comprises the tuned transformer 121, which transformer is, for purposes of illustration, tuned to the tenth harmonic of the pulse generator 101. There will, therefore, appear in the secondary side of the transformer 121 energy having a frequency ten times that of the synchronizing signals of the pulse generator, or 157.5 kc. for the above assumed example.

Therefore, the tube 131 fed from the transformer 121 serves as a limiter to remove any amplitude variation which may have been present in the output energy of the transformer 121. The tube 131, similarly to the tube 117, is operated with zero bias and low screen grid voltage and includes the grid current limiting resistor 129. The output of the tube 131 passes through further tuned circuits 133 and is fed to the amplifier 141, which has an output circuit 143 also tuned to provide further filtering so that a substantially pure sinusoidal wave having a frequency of 157.5 kc. is supplied to the tube 155. It will be appreciated that the circuits 133 and 143 are both tuned to the tenth harmonic of the pulse generator.

In the output circuit of the tube 155 there is connected the fine adjustment phase shifter. This connection comprises a serially connected resistor 165 with serially connected variable condenser 161 and fixed condenser 163, which junction point of the condensers is connected to the plate of the tube 155 which is fed from the power supply 171 through the resistors 169 and 173. One terminal of the resistor 165 is connected to the common junction point of the resistors 157 and 159, which serially connected resistors are connected between the cathode of the tube 155 and one side of the power supply. By choosing the resistors 173 and 159 to be substantially equal and by an appropriate selection of value for the resistor 157, one obtains the same result as from the use of a center tapped secondary of a transformer, that is to say, that the potential drop across the resistor 173, at the effective frequency used, is equal to the drop across the resistor 159 and properly phased so as to be additive to the voltage across the resistor 159. In other words, the voltage measured between the common junction point of the resistors 157—159 and the plate of the tube 155 is twice the voltage measured across the resistor 173 alone or the resistor 159 alone. This arrangement enables, therefore, the elimination of the use of a transformer and provides somewhat more efficient operation, especially at high frequencies where it is difficult to obtain efficient transformers.

The 157.5 kc. output of the phase shifter serves to actuate the horizontal deflection plates 177 of the cathode ray tube 179. It will be appreciated that the horizontal deflection will be ten times the rate which would have been obtained if the fundamental frequency were used, and the effect of this is to stretch out the wave and enhance the precision of adjusting coincidence of the trace with the index marks.

In Figure 5 there have been shown appropriate resistors and decoupling condensers, such as are used conventionally in the art, to supply voltages to the screen grids and plates of the various tubes and to avoid unintentional feedback.

Certain advantages accrue from making the coarse phase adjustment at the fundamental frequency, as shown in Figure 5, because it will be observed that only a small variation in the resistor 107 is necessary to produce a good sized shift in the visual correction on the screen. This arises from the fact that the phase shift at the fundamental frequency is multiplied in direct proportion to the multiplication of frequency provided by the further stages 117 and 131, and, in the example given, one degree of phase shift at the fundamental frequency will amount to ten degrees phase shift on the screen. Thus the coarse adjustment provides a wide range of shifting of the visual trace.

It will be appreciated that while the invention has been described with reference to determining slope and duration of television synchronizing impulses, it is by no means restricted to the measurement of such signals. The wave form of any type of electrical signal may be similarly determined by using the method and apparatus embodied in my invention.

It will also be appreciated that other types of phase adjusters, frequency multipliers or wave shape converters may be used without departing from the scope of my invention, since those elements described in detail above were merely illustrative and not exclusive.

Various alterations and modifications of the present invention may become apparent to those skilled in the art and it is desirable that any and all such modifications and alterations be considered within the purview of the present invention except as limited by the hereinafter appended claims.

Having described my invention, what I claim is:

1. Measuring apparatus for determining time duration of recurrent electrical signals comprising an oscillograph having a viewing surface, reference indicia in register with said viewing surface, terminal means for connection to a source of signals, means to produce a visual trace in one direction on said viewing surface by said source of signals, wave shape converting apparatus supplied from said source of signals, a thermionic amplifier, a phase shifter connected between said converting apparatus and said amplifier, means to produce a visual deflection on said viewing screen at right angles to said first trace, and a second phase shifting means connected between said amplifier and said deflection means.

2. Apparatus as claimed in claim 1 wherein said phase shifting means is adjustable and comprises indicating means calibrated in per cent of one cycle.

3. Measuring apparatus for determining time duration of recurrent electrical signals comprising an oscillograph having a viewing surface, reference indicia in register with said viewing surface, terminal means for connection to a source of signals, means to produce a visual trace in one direction on said viewing surface by said source of signals, wave shape converting apparatus supplied from said source of signals to produce voltage variations of a predetermined wave form, a frequency multiplier responsive to the voltage variations of predetermined wave form to produce a visual deflection on said viewing screen at right angles to said first trace, and phase shifting means connected between said frequency multiplier and said deflection means.

4. Apparatus as claimed in claim 3 wherein said phase shifting means is adjustable and comprises indicating means calibrated in per cent of one cycle.

5. Measuring apparatus for determining time duration of recurrent electrical signals comprising an oscillograph having a viewing surface, reference indicia in register with said viewing surface, terminal means for connection to a source of signals, means to produce a visual trace in one direction on said viewing surface by said source of signals, wave shape converting apparatus supplied from said source of signals, a frequency multiplier, a phase shifter connected between said converting apparatus and said frequency multiplier, means to produce a visual deflection on said viewing screen at right angles to said first trace, and a second phase shifting means connected between said frequency multiplier and said deflection means.

6. Apparatus as claimed in claim 5 wherein said phase shifting means is adjustable and comprises indicating means calibrated in per cent of one cycle.

7. Measuring apparatus for determining time duration of recurrent electrical signals comprising an oscillograph having a viewing surface, reference indicia in register with said viewing surface, terminal means for connection to a source of signals, means to produce a visual trace in one direction on said viewing surface by said source of signals, wave shape converting apparatus supplied from said source of signals, a first phasing means fed from said converting apparatus, a frequency multiplier connected to said phase shifting means, a limiter connected to said frequency multiplier, means to produce a visual deflection on said viewing screen at right angles to said first trace, and a second phase shifting means connected between said limiter and said deflection means.

8. Apparatus as claimed in claim 7 wherein said phase shifting means is adjustable and comprises indicating means calibrated in per cent of one cycle.

9. Measuring apparatus for determining the time duration of recurrent electrical signals comprising an oscillograph including a cathode ray beam and a viewing screen, a reference indicia in register with said viewing screen, means to cause deflection of the cathode ray beam in one direction in response to the recurrent electrical signals, means to deflect the cathode ray beam in a substantially mutually perpendicular direction at a rate bearing an integral relation to the frequency of the recurrent electrical signals whereby a substantially stationary visual representation of the recurrent signals is produced on the viewing screen, and means including a calibrated phase shifting network for altering the phase relationship of the deflections relative to each other so that different portions of the representation may be associated with the reference indicia whereby the time duration of the recurrent signals may be determined.

FRANK J. SOMERS.